US006516161B2

(12) United States Patent
Asai

(10) Patent No.: US 6,516,161 B2
(45) Date of Patent: Feb. 4, 2003

(54) IMAGE FORMING APPARATUS WITH SURFACE POTENTIAL DETECTOR

(75) Inventor: Jun Asai, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/804,256

(22) Filed: Mar. 13, 2001

(65) Prior Publication Data

US 2001/0033754 A1 Oct. 25, 2001

(30) Foreign Application Priority Data

Mar. 16, 2000 (JP) ....................................... 2000-079315

(51) Int. Cl.[7] ................................................ F03G 15/00
(52) U.S. Cl. ......................................................... 399/48
(58) Field of Search ............................. 399/46, 48, 50, 399/31

(56) References Cited

U.S. PATENT DOCUMENTS 4,563,081 A 1/1986 Sato ............................ 355/14
5,438,399 A 8/1995 Asai ........................... 355/273
5,457,519 A 10/1995 Morrison et al. ........... 355/208
5,619,308 A 4/1997 Kinoshita et al. ............. 399/48
5,797,072 A * 8/1998 Ehara et al. ................ 361/225
5,937,224 A 8/1999 Budnik et al. ................ 399/26

FOREIGN PATENT DOCUMENTS

JP 5-323741 12/1993
JP 5-323742 12/1993
JP 9-127830 5/1997
JP 10-228159 8/1998
JP 2000-19817 * 1/2000

* cited by examiner

*Primary Examiner*—Joan Pendegrass
(74) *Attorney, Agent, or Firm*—Fitzpatrick, Cella, Harper & Scinto

(57) ABSTRACT

An image forming apparatus includes an image bearing member and an image formation unit for forming an image on the image bearing member. The image formation unit is provided with a charger for charging the image bearing member. A potential detector detects a surface potential on the image bearing member charged by the charger. A controller controls an image formation condition of the image formation unit on the basis of a potential detected by the potential detector. The controller controls the image formation condition on the basis of a plurality of detected potentials corresponding to respectively different non-image areas between sequentially formed images.

9 Claims, 5 Drawing Sheets

FIG. 3

| | A(0) | A(1) | A(2) | A(3) | A(4) | A(5) | A(6) | A(7) |
|---|---|---|---|---|---|---|---|---|
| 0 | × | × | × | × | × | × | × | × |
| 1 | × | ○ | × | × | × | × | × | × |
| 2 | × | ○ | × | × | ○ | × | × | × |
| 3 | × | ○ | × | × | ○ | × | × | ○ |
| 4 | × | ○ | ○ | × | ○ | × | × | ○ |
| 5 | × | ○ | ○ | × | ○ | ○ | × | ○ |
| 6 | ○ | ○ | ○ | × | ○ | ○ | × | ○ |
| 7 | ○ | ○ | ○ | ○ | ○ | ○ | × | ○ |
| 8 | ○ | ○ | ○ | ○ | ○ | ○ | ○ | ○ |

○ : STATE MEASURED ONE TIME OR MORE
× : STATE NOT MEASURED ONCE

IMAGE FORMING APPARATUS WITH SURFACE POTENTIAL DETECTOR

BACKGROUND OF THE INVENTION

1. Field of the Invention

The present invention relates to an electrophotographic image forming apparatus, such as a copier or a printer.

2. Related Background Art

A conventional electrophotographic image forming apparatus is, for example, a copier or a laser beam printer.

For a well known conventional image forming apparatus, such as a copier or a laser beam printer, a potential sensor is provided inside an image forming area to measure the surface potential of a photosensitive member. During warm-up, the potential of the photosensitive member is measured after the charging and after the exposure, and the primary charge current, the grid potential of the primary charger, a laser exposure light amount (or light quantity) and a developing bias are controlled and determined.

Further, in another well known image forming apparatus, when a specific time has elapsed since the power was turned on or since the warm-up was completed, the image forming apparatus prevents a change in the internal temperature by controlling the potential again, a change in the time-transient laser light amount, a change in the charge capacity due to the photosensitive member, and a potential change due to the change of the sensitivity.

However, the following problem is encountered with a conventional image forming apparatus.

Since for a high-speed apparatus the prevention of productivity reductions is important, conventionally, potential control is not provided because sufficient time can not be allocated during the performance of a continuous job, such as one that involves continuous copying or printing.

Further, when the potential measured at a short paper feeding interval is to be controlled to prevent a reduction in productivity, the uneven potential around the circumference of the photosensitive member adversely affects potential control, so that it can not appropriately be provided, and image fogging and low image density may occur.

According to the technique disclosed in Japanese Patent Application Laid-Open No. 10-228159, based on the potential corresponding to a specific location on a photosensitive member, the charging condition is changed in order to uniformly charge the photosensitive member during an image forming period. Thus, the occurrence of uneven image density during an image forming period is prevented.

However, the objective of this technique is the prevention of an occurrence of uneven image density during an image forming period, and not to prevent a time-transient change of the laser during a continuous job and a time-transient change of the potential of a photosensitive member during a continuous job.

Further, according to the technique disclosed in Japanese Patent Application Laid-Open No. 5-323741 or 5-323742, the potential at a specific location on a photosensitive member, or the average potential, is stored as a reference value, and the potential at the specific location is measured, so that a potential change on the photosensitive member can be detected.

However, with this technique, since the potential is detected at a specific location on the photosensitive member, the detection precision is unsatisfactory. Further, according to this method, position information detection means, such as a detector or a sensor, is employed for obtain the reference potential for the photosensitive member and information concerning the corresponding location of the photosensitive member, so that manufacturing costs are increased.

When, instead of the position information detection means, such as the detector or the sensor, means is employed for counting the position information for the photosensitive member using a counter and for identifying the photosensitive member area, the count information is deleted when the main body is powered off. Thus, when the main body is again powered on, the reference potential and the correlation of positions must be remeasured, so that productivity is reduced.

SUMMARY OF THE INVENTION

It is one objective of the present invention to provide an image forming apparatus that increases the image forming productivity.

It is another objective of the present invention to provide an image forming apparatus having a superior image quality that can provide appropriate control for changes of the surface potential on an image bearing member.

It is an additional objective of the present invention to provide an image forming apparatus for detecting the surface potential at a different location on an image bearing member.

It is a further objective of the present invention to provide an image forming apparatus for, when images are continuously being formed on multiple recording media, detecting the surface potential at a location on an image bearing member that corresponds to a different interval between recording media.

According to one aspect of the present invention, an image forming apparatus is provided with an image bearing member and an image formation unit for forming an image on the image bearing member. The image formation unit is includes a charger for charging the image bearing member. A potential detector detects a surface potential on the image bearing member charged by the charger. A controller controls an image formation condition of the image formation unit on the basis of a potential detected by the potential detector. The controller controls the image formation condition on the basis of a plurality of detected potentials corresponding to respectively different non-image areas between sequentially formed images.

BRIEF DESCRIPTION OF THE DRAWINGS

FIG. 3 is a diagram showing the transition of the data storing for segments A(0) to A(7) during one revolution of the photosensitive member;

DETAILED DESCRIPTION OF THE PREFERRED EMBODIMENTS

The preferred embodiments of the present invention will now be described in detail while referring to the accompanying drawings. It should be noted, however, that without departing from the scope of the invention, the sizes, the materials, the shapes and the relative positions of components described in the embodiments are not limited to those mentioned in the description.

First Embodiment

An image forming apparatus according to a first embodiment will now be described while referring to FIGS. 1 to 4.

Figure 1:
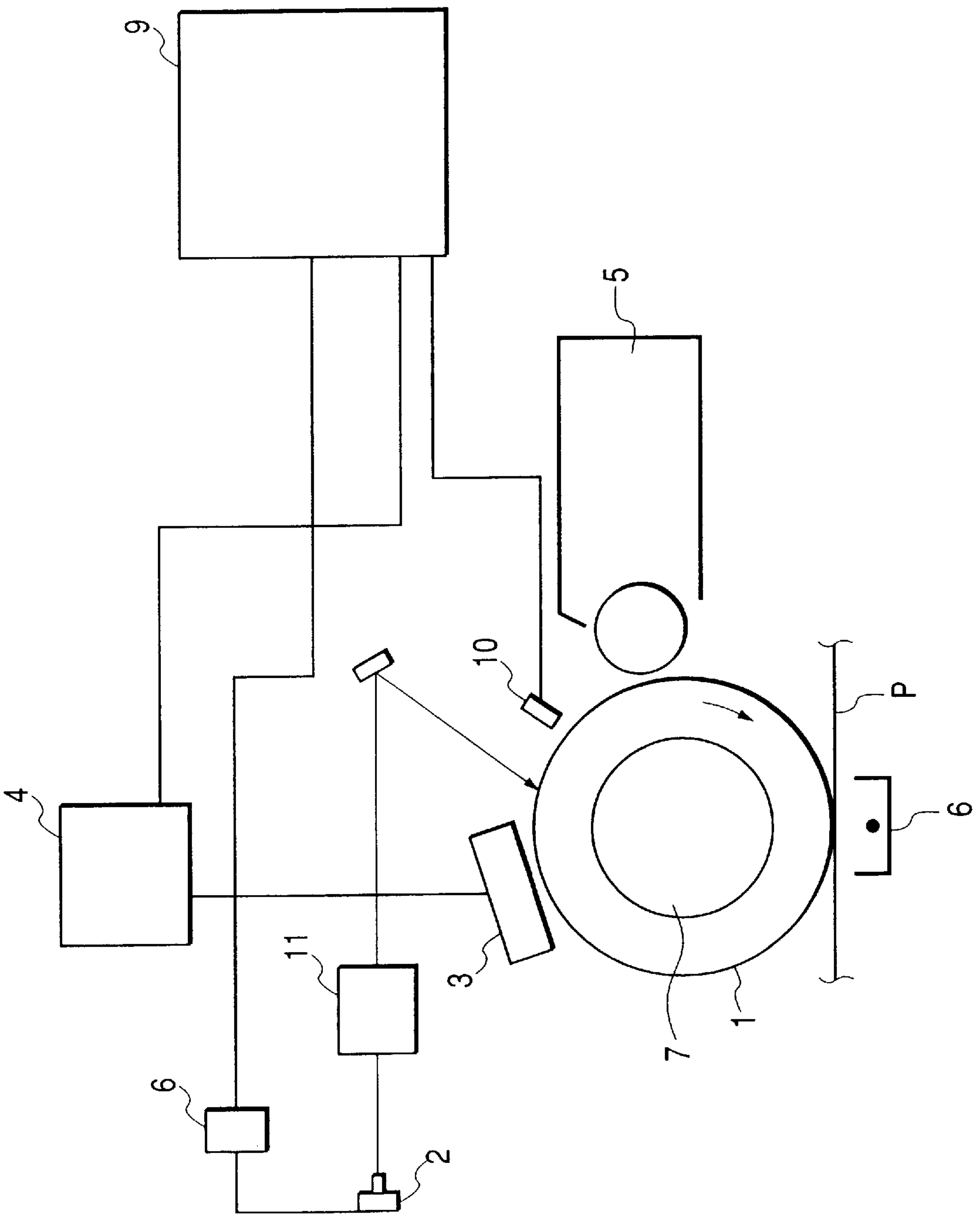
FIG. 1 is a schematic diagram showing the arrangement of an image forming apparatus according to the embodiments of the present invention.

First, the general configuration of the image forming apparatus will be explained while referring to FIG. 1. FIG. 1 is a schematic diagram showing the configuration of the image forming apparatus (electrophotographic copier) according to the embodiments of the present invention.

As is shown in FIG. 1, in the image forming apparatus, various components are provided around a photosensitive member, which serves as an image bearing member, in order to perform a well known image forming process. The essential components will now be described in the order in which they are employed during the image forming process.

First, a primary charger 3, driven by a high-voltage power source 4, is provided as charging means for uniformly charging a photosensitive member 1, which serves as an image bearing member.

When the photosensitive member 1 is charged by the primary charger 3, a latent image is formed on the photosensitive member 1 by a laser 2, which serves as exposure means. The laser 2, which is driven by a laser driver 6 that, in turn, is controlled by a controller 9, exposes and scans the photosensitive member 1 through a polygon scanner 11.

Two developing methods are used: a method for defining an unexposed portion as a latent image that corresponds to the final image, and a method for defining an exposed portion as a latent image. In the following explanation, the first method, i.e., the normal developing method is employed.

Continuing, a potential sensor 10 is provided downstream of the latent image forming portion, which uses the laser 2, and serves as potential measurement means for measuring the surface potential of the photosensitive member 1. A developing device 5 is also provided downstream of the potential sensor 10, and serves as development means for developing the latent image.

Additionally provided are transfer means 6 for transferring to a transfer sheet P, which is a recording medium, the image developed by the developing device 5, and fixing means (not shown) for fixing the image after it is transferred to the transfer sheet P.

The photosensitive member 1 is a substantially cylindrical amorphous silicon (a-Si) drum, having a diameter of 100 mm, that carries a positive polarity charge and that has a processing speed of 250 mm/sec. Further, as is described above, downstream of the primary charger 3 and the exposure position, and upstream of the developing position in the direction in which the photosensitive member 1 is rotated, the potential sensor 10 is provided within the longitudinal image forming range.

The potential sensor 10 is a well known sensor having an electrode inside a vibrator.

A one-component negative triboelectric magnetic toner is employed as a developer, a general-purpose semiconductor having a wavelength of 670 nm and a maximum output of 30 mW is employed as the laser 2, the light exposure source, and, as is described above, the polygon scanner 11 is employed for exposure and scanning. The temperature characteristic of the monitor current of the semiconductor laser 2 is ±1%/K, and heating means and temperature control means are therefor not provided.

Inside the photosensitive member 1, an approximately 40 W photosensitive heater 7 is provided as heating means. The photosensitive heater is driven only when the image forming apparatus is powered on.

An experiment was conducted on the assumption that the temperature is changed the greatest at the laser chip of the apparatus of this embodiment. In this experiment, the image forming apparatus, with the main switch off, was held one night at a low temperature of 7.5° C. Then, the main switch was turned on, and during the warm-up, a continuous job was started after the normal potential control process was completed, while at the same time, the ambient temperature was raised to 25° C. for about 30 minutes. At this time, the temperature at the laser chip was about 12° C. during the potential control process at the warm-up, and was about 32° C. after one hour passed following the start of the continuous job, and it was thus found that there was a 20 K rise.

The processing performed by the image forming apparatus according to this embodiment will now be described.

After the main switch is turned on, the following well known potential control process is performed until the temperature of the fixing unit reaches a predetermined temperature, e.g., about 185° C. (during the warm-up).

For control of a dark potential (VD), feedback control is performed for the primary current supplied to the primary charger 3, and a control current value is determined, so that, while the primary charge is applied by the primary charger 3, the surface potential of the photosensitive member 1 converges to a specific target potential VDT at the measurement position for the potential sensor 10.

The primary current is supplied by transmitting a 10-bit control signal from the controller 9 to the DA converter, and by controlling a value transmitted to the high voltage controller.

Following this, the primary charge is performed using the primary current obtained by the above method, and the image exposure is performed by the laser 2. Feedback control is provided for the laser light amount, and the laser control value is determined, so that the light potential (VL) converges to a specific target potential VLT.

Laser control is provided by transmitting an 8-bit control signal from the controller 9 to the DA converter, and the primary current value and the laser control value obtained when the potential control process was performed are stored in the memory.

An explanation will now be given for the light quantity inter-sheet correction, a correction of the light quantity performed during a continuous job (while images are sequentially being formed on multiple recording mediums), especially while referring to FIG. 4, which is a flowchart for the main control of the image forming apparatus according to this embodiment.

After the photosensitive member 1 has begun to rotate (S1) and has attained a constant rotational speed, the timer comprising identification means initiates counting from an arbitrary time (S2).

The timer delimits segments A(0) to A(7) by dividing one circumference of the photosensitive member 1 by eight, and during the same job, the segments A(0) to A(7) are allocated for specific positions on the photosensitive member 1. The segments are those obtained by equally dividing the surface of the photosensitive member 1 at a rotation angle of 22.5°.

Following this, the measured surface potentials are correlated with the segments in the non-image area (hereinafter referred to as a recording medium interval area) having the VL equivalent potential, which for a continuous job is present between the image forming areas. The following method is then used to store the information for the potential and the segment in the memory. For example, when the potential in the segment A(0) has been detected, the segment A(0) is shifted to the transfer position, and at this position the segment A(0) does not contact any recording mediums, and is positioned between the trailing edge of one recording medium and the leading edge of the succeeding recording medium.

In this embodiment, the margin at the trailing edge of the recording medium and the margin at the leading edge of the succeeding recording medium are included in the non-image forming areas that are located upstream and downstream of the image forming area in the forward direction, and the laser is emitted at the same intensity as for the image exposure. Thus, the entire non-image forming area has a VL equivalent potential.

In this embodiment, during a continuous job for the cross feeding of LTR size paper, the length of the non-image forming area in the forward direction is 50 mm at the minimum. While images are sequentially formed on multiple recording mediums, the interval between the recording mediums (the recording medium interval) is set so that it is shorter than the length of the circumference of the photosensitive member 1. At this time, the reading range must be set, so that the potential at the image is affected neither by the reading detection width of the potential sensor in the static state nor the dynamic response of the potential sensor.

The distance between the potential sensor 10 and the photosensitive member 1 of this embodiment is 1.7 to 2.3 mm, and the reading detection width in the static state is about 3 mm at a potential of 90% (when the potential of the measurement target is 100%, the width for which a potential of 90% is obtained is about 3 mm). The dynamic response of the potential sensor 10 is 80 to 120 ms until a change of from 0 V to 400 V is stabilized, and is 30 to 50 ms until a change of from 400 V to 0 V is stabilized.

From these characteristics, in this embodiment, the potential measurement position is defined as 25 mm to 30 mm from the trailing edge of the image. When the value VLM (X) is measured at an arbitrary location in each segment, it is defined as a typical potential VLM(X) for the segment.

While taking momentary noise into account, the potential is measured four times every 10 ms, and the average of four measurements is used as a single measurement value VLM (X). It should be noted that the segment is identified at the middle position for the four measurements.

Figure 4:
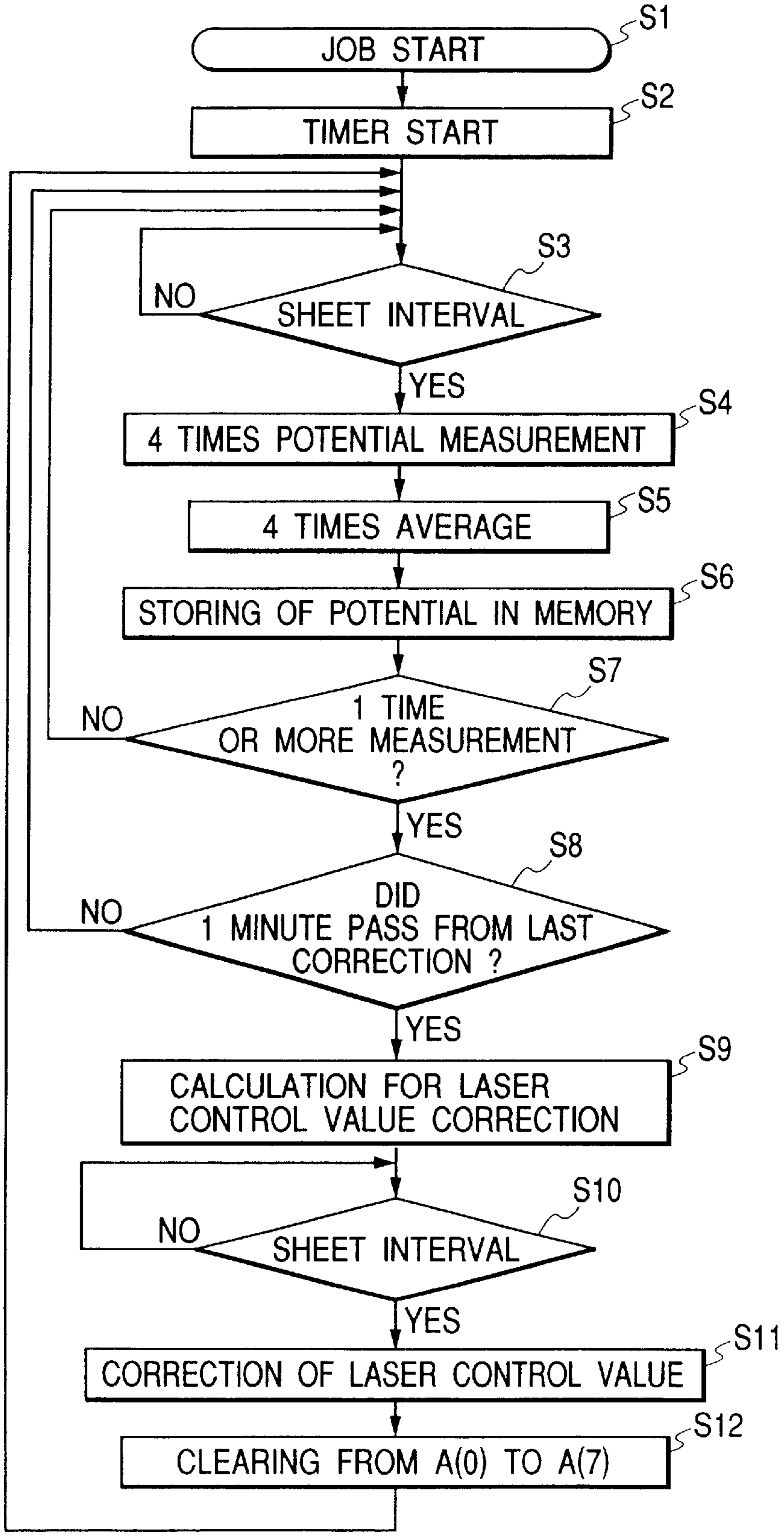
FIG. 4 is a flowchart of the main control provided by an image forming apparatus according to a first embodiment of the present invention.

That is, in FIG. 4, whether the area is the gap between the sheets (the recording medium interval area) is determined (S3). If the area is the gap between the sheets, the potential sensor measures the potential four times (S4), and the average of the four potential measurements is obtained (S5) and is stored in the memory (S6).

When this process is repeated, the above potential measurement is performed at each recording medium interval, and the measured value obtained at each segment described above is stored.

Figure 2:
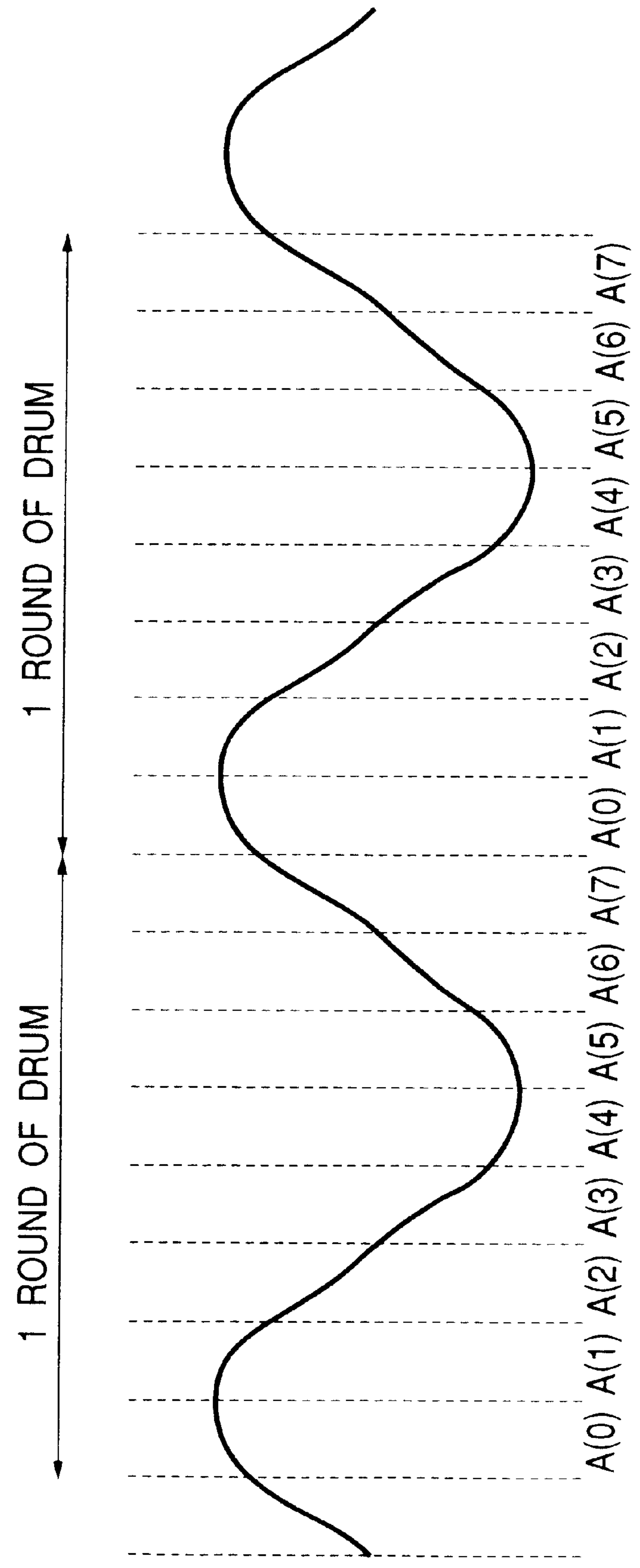
FIG. 2 is a diagram showing a circumferential profile of the VL potential of a photosensitive member.

FIG. 2 is a diagram showing the potential profile for VL in the circumferential direction of the photosensitive member 1. Due to the eccentricity of the photosensitive member 1, the potential on the photosensitive member 1 during one rotation varies while the laser control value is constant. The horizontal axis represents the position in the circumferential direction on the photosensitive member 1, and the vertical axis represents VL. Further, the segments A(0) to A(7) correspond to the inherent positions on the photosensitive member 1 during one rotation.

FIG. 3 is a diagram showing the state wherein the measurement data for the segments A(0) to A(7) are stored for each measurement made at the recording medium interval. The surface potential of the photosensitive member 1 is measured at the recording medium interval in the order of the numbers as indicated by an arrow. A 0 is entered when the data for the individual segments were obtained at least one time following the beginning of the continuous job, and an X is entered when the data was not measured even once. That is, in FIG. 3, the area at the first recording medium interval is segment A(1), the area at the second recording medium interval is segment A(4), and the area at the eighth recording medium interval is segment A(6).

In FIG. 3, only the minimum eight recording medium interval measurements were required to measure each of the segments A(0) to A(7) at least once. However, 30 or more measurements may be required, depending on the paper size, the setting of the interval for recording mediums and the circumferential length of the photosensitive member 1; however, normally, 10 to 30 times are sufficient to complete all the measurements for segments A(0) to A(7).

When the typical potential VLM(X) is obtained at least once during the sequential image forming process, the potential VLM for one round of the photosensitive member 1 is calculated as the average potential for all the segments. Then, when the potential is measured again for the segments, the potential is updated to the latest value.

When the measurement of the segments A(0) to A(7) is completed (S7), and when the timer activated when the job was begun counts the period of the integral times for one minute (S8), the potential VLM for one revolution of the photosensitive member 1, the target potential VLT and the laser light amount control value PB before correction are employed to obtain the laser light amount control value PA after a correction is performed using the following equation (S9).

$$PA=PB+\alpha(VLM-VLT),$$

where $\alpha$ denotes a control coefficient, which is a predetermined fixed value obtained using the sensitivity of the photosensitive member 1 and the input/output value for the DA converter of the laser power.

The correction is performed at the first recording medium interval after a predetermined time has elapsed since the continuous job was begun. Thereafter, the above value obtained following the correction is employed as the primary current control value, and as the laser control value before the next correction is initiated.

Following the correction, the values of all the segments A(0) to A(7) are cleared (S12). Then, the potential is newly measured for these segments, and the measurement and correction are repeated during the course of the continuous job.

In the above explanation, during the course of the continuous job the recording medium interval areas are used as potential measurement areas. However, other areas aside from those can be used during the continuous job. For example, non-image areas established for the pre-rotation (image forming preparation operation) and the post-rotation (post-processing of image forming) during the course of the continuous job may be defined as potential measurement areas, and employed using the same method.

Further, the potential sensor 10 can provide the above control by using the measured value of the potential after the charging and before the exposure.

Furthermore, in this embodiment, the correction equation is calculated while using the VLT as a target. However, instead of the VLT, the actual VL value obtained by the potential control may be used as a target.

Further, in the above explanation, the laser control value (exposure amount) is corrected; however, instead of the laser control value, a developing bias (the direct-current component of a developing bias) may be corrected.

Second Embodiment

Figure 5:
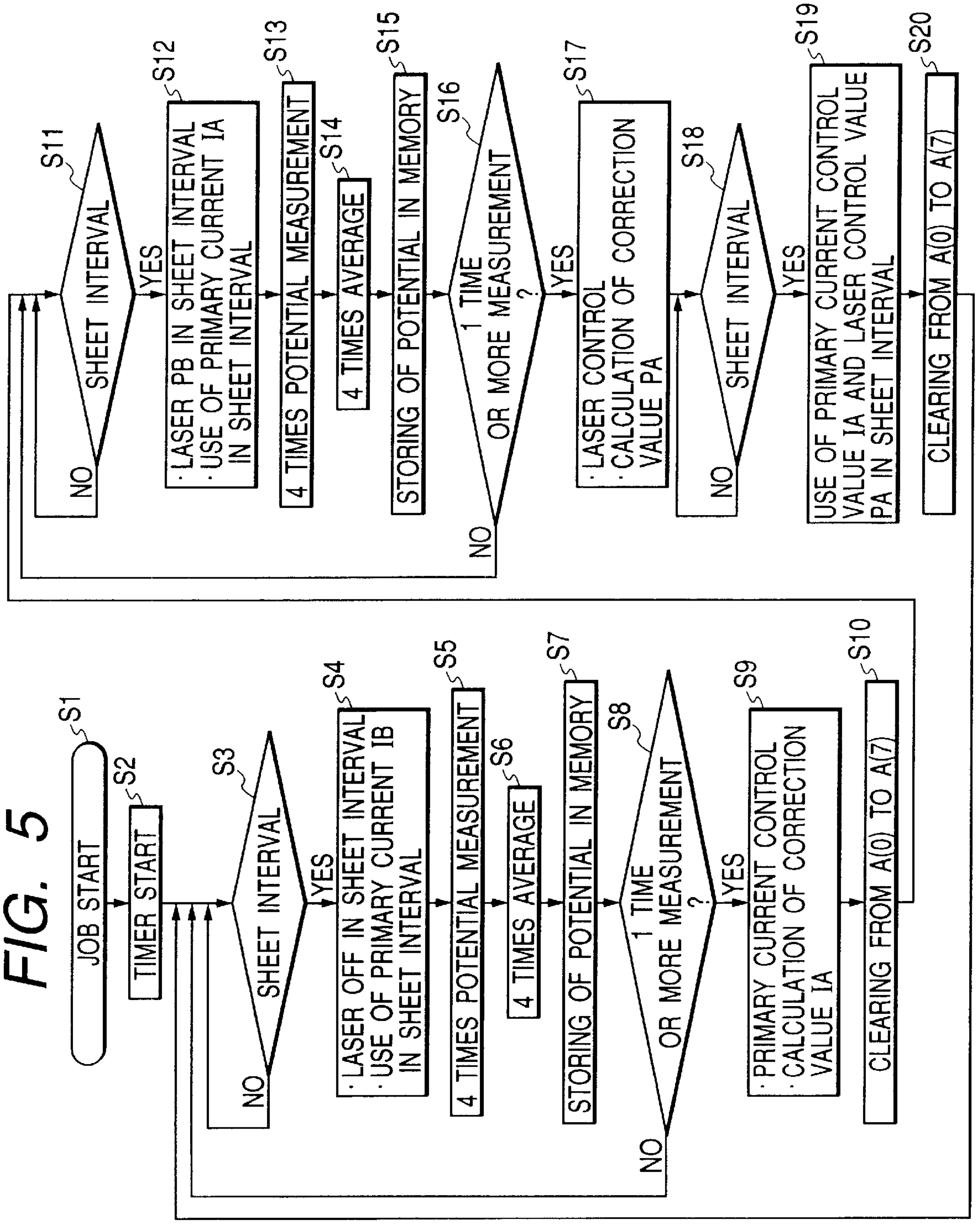
FIG. 5 is a flowchart for the main control provided by an image forming apparatus according to a second embodiment of the present invention.

FIG. 5 is a flowchart for a second embodiment. In the first embodiment, the exposure amount (laser control value) is adjusted, while in this embodiment, both the charge value and the exposure amount are adjusted.

Since the basic arrangement is the same as that in the first embodiment, no explanation for it will be given.

In this embodiment, at the first step the correction value of the primary current value (charge amount) is calculated at the recording medium interval, at the second step the correction value of the laser control value (exposure amount) is calculated, at the third step both the primary current value and the laser control value are corrected at the recording medium interval, and the obtained value is used as a control value in the succeeding image area.

The basic configuration of the main body of the image forming apparatus is the same as that in the first embodiment, but it should be noted that a drum heater is not employed for the photosensitive member 1, and that the temperature characteristic for the charging capability of the photosensitive member 1 is 2 V/K, and the temperature characteristic for the sensitivity is 3 V/K.

An experiment was conducted on the assumption that in this embodiment the photosensitive member 1 experiences the greatest temperature change. In this experiment, with the main switch off, the image forming apparatus was held for one night at a low temperature of 7.5° C. Then, the main switch was turned on, and during the warm-up a continuous job was started after the normal potential control has been completed, while at the same time the ambient temperature was raised to 25° C. for about 30 minutes. At this time, the temperature of the photosensitive member 1 was about 10° C. during the potential control provided at the warm-up, and was about 30° C. when one hour had passed following the initiation of the continuous job, so that it was found that there was a rise of 20 K.

The processing performed by the image forming apparatus according to this embodiment will now be described.

The potential control process during the warm-up is the same as that for the first embodiment, and at this time, the primary current value IB and the laser control value PB are stored.

The correction of the light amount at the recording medium interval during the continuous job will now be described while referring to FIG. 5. FIG. 5 is a flowchart showing the main control provided for the image forming apparatus of this embodiment.

When the continuous job is initiated (S1) and the timer is begun (S2), the primary current is set to IB at the recording medium interval, and the laser emission is halted, so that a VD portion is formed. At this time, the DC of the developing bias is raised, and the AC component is eliminated, so that the development of the VD portion on the photosensitive member 1 is prevented. The potential measurement position is defined as being 25 mm to 30 mm from the trailing edge of the image so that it is not affected by the image.

The potential is measured at four times, and the average is defined as one measurement value. When the potential measurement is repeated at the recording medium intervals, the VD is obtained for all the segments A(0) to A(7) around the circumference of the photosensitive member 1. When VDs are obtained for all the segments, the average of these is defined as the potential VDM for one revolution of the photosensitive member 1.

Specifically, whether the segment is at the recording medium interval is determined (S3). When the segment is at the recording medium interval, the primary current is set to IB and the laser emission is halted (S4), and the potential is measured four times by the potential sensor 10 (S5). The average potential is then calculated using the four measurement results (S6), and is stored in the memory (S7).

When the potential has been measured for all the segments A(0) to A(7) at least once (S8), program control shifts to the next step.

That is, the potential VDM for one round of the photosensitive member 1, the target potential VDT and the primary current control value before correction are employed to calculate the primary current control value IA after a correction is performed using the following equation (S9).

$$IA=IB+\beta(VDT-VDM),$$

where β denotes which is a predetermined fixed value obtained from the charge capability for the photosensitive member 1 and the input/output characteristic of the DA converter for the primary current control.

At the second step, the correction value for the laser control value is calculated. The primary current value is defined as IA at the recording medium interval, and the IB control value is employed for the image area.

First, the values of all the segments A(0) to A(7) are cleared (S10), and substantially as in the first embodiment, whether the segment is at the recording medium interval is determined (S11). If the segment is at the recording medium interval, the laser light amount control value at the recording medium interval is set to PB, and the primary current value is set to IA (S12). The potential is measured four times by the potential sensor 10 (S13), and the average potential is calculated using the four measured values (S14) and is stored in the memory (S15).

When VLs have been measured for all the segments A(0) to A(7) (S16), the average potential, which is defined as the potential VLM, the target potential VLT and the laser light amount control value PB before correction are employed to calculate the laser light amount value after the correction in accordance with the following equation (S17).

$$PA=PB+\alpha(VLM-VLT)$$

where α denotes a control coefficient, which is a predetermined fixed value obtained for the sensitivity of the photosensitive member 1 and the input/output value of the DA converter of the laser power.

Unlike the first embodiment, the correction is performed at the first recording medium interval after the above two values are calculated (S18). That is, for the correction, the primary current control value IB and the laser control value PB are changed to IA and PA (S19), and thereinafter the values IA and PA are employed until the next correction.

After the correction, the values for all the segments A(0) to A(7) are cleared (S20), and the primary current control value and the laser control value are newly obtained for the individual segments, and correction of these control values at the recording medium intervals is repeated during the continuous job.

In this embodiment, since both the VD and VL are corrected, a more precise correction can be performed than in the first embodiment. This is especially effective for a case wherein, under the conditions wherein no drum heater is employed or wherein the drum heater has been turned off at nighttime, air conditioning is turned on in the morning in the summer or the winter and the temperature in the environment is changed drastically.

As is described above, according to the embodiments, attention is paid to the fact that the temperatures of the laser and the photosensitive member, and the charging and light fatigue of the photosensitive member are changed at a speed that is equal to or smaller than 1% for several tens of minutes, which is a comparatively long time-transient phenomenon, and that the time until the potential for one rotation of the photosensitive member, which is obtained by repetitive measurements, is satisfactorily short. Thus, the individual members are adjusted based on data provided by multiple measurements, so that the image quality can be maintained (prevention of image fogging, image density changes and image fluctuation due to the potential changes experienced by the photosensitive member 1 during the continuous job).

Further, during the course of the continuous job, the light intensity or the primary current value can be controlled with no deterioration of productivity. In addition,since the changes in the laser light amount due to the temperature change around the laser, the potential due to the temperature of the photosensitive member, the light history and the charging history are prevented, stable image quality can be obtained without image fogging and a low image density occurring during the continuous job.

In addition, since the comparison results of the average potentials of the photosensitive member are employed for the correction, the correction can be performed based on more accurate detections.

Further, since the temperature can be adjusted appropriately, a general-purpose semiconductor laser having a temperature characteristic ±1%° C. of the monitor current, for which temperature control is conventionally required, can be employed without the heating means and the temperature control means being required. As a result, reliability is increased by reducing the number of parts, and the manufacturing costs and energy consumed can be reduced.

Moreover, since the detector or the sensor is not required to obtain specific position information for the photosensitive member, the position information need only be managed during a continuous job.

Even when potential drift occurs due to the charging history and the light history of the photosensitive member, the potential can be corrected more accurately than in the conventional case, and image density changes and image fogging during a continuous job can be prevented, without no productivity reduction.

In addition, even when the sensitivity characteristic is changed due to a change in the temperature of the photosensitive member, the potential of the photosensitive member can be accurately corrected. No heater is required for the photosensitive member, and since it is not necessary, after the main switch is turned off, for a heater for the photosensitive member to be kept on, a savings in energy can be realized.

Furthermore, even when the potential after the exposure is changed over time by the altering of the spot diameter of the laser, which is caused by a rise in the temperature in the optical parts during a continuous job, the potential of the photosensitive member can be accurately corrected. Thus, no countermeasure is required for a the temperature rise, and the reliability of the apparatus is improved.

What is claimed is:

1. An image forming apparatus comprising:

an image bearing member;

image formation means for forming an image on said image bearing member, said image formation means being provided with charging means for charging said image bearing member;

potential detection means for detecting a surface potential on said image bearing member charged by said charging means; and control means for controlling an image formation condition of said image formation means on the basis of a potential detected by said potential detection means, wherein said control means controls the image formation condition on the basis of a plurality of detected potentials corresponding to respectively different non-image areas between sequentially formed images.

2. An image forming apparatus according to claim 1, wherein detected portions corresponding to the plurality of detected potentials are different in positions of a moving direction of said image bearing member respectively.

3. An image forming apparatus according to claim 2, wherein said control means controls the image formation condition on the basis of an average value of the plurality of detected potentials.

4. An image forming apparatus according to claim 2, wherein the detected portions corresponding to the plurality of detected potentials are substantially apart from each other by a predetermined distance.

5. An image forming apparatus according to claim 1, wherein said potential detection means detects the surface potential a plurality of times in one non-image area and determines the potential of the non-image area on the basis of the plurality of detected potentials.

6. An image forming apparatus according to claim 1, wherein said image bearing member is roll shaped, and said potential detection means detects the surface potential for each of a plurality of predetermined intervals of the surface of said image bearing member through one rotation of said image bearing member.

7. An image forming apparatus according to claim 1, wherein said control means controls a charging condition of said charging means.

8. An image forming apparatus according to claim 1, wherein said image formation means further comprises exposure means for image-exposing said image bearing member charged by said charging means, and said control means controls a light amount for image-exposing by said exposure means.

9. An image forming apparatus according to claim 8, said image forming apparatus further comprising:

developing means for developing with a toner a latent image formed by the image-exposing of said exposure means; and transfer means for transferring the toner image to a transfer material.

* * * * *